United States Patent Office 3,565,581
Patented Feb. 23, 1971

3,565,581
PRODUCTION OF HYDROGEN PEROXIDE IN THE ANTHRAQUINONE PROCESS USING A NOVEL CATALYTIC FIXED BED
Nathan D. Lee, Lambertville, N.J., assignor to FMC Corporation, New York, N.Y., a corporation of Delaware
No Drawing. Filed May 16, 1968, Ser. No. 729,561
Int. Cl. C01b 15/02; C07c 49/68
U.S. Cl. 23—207                                       8 Claims

ABSTRACT OF THE DISCLOSURE

In the process of producing hydrogen peroxide by the anthraquinone process in which an anthraquinone compound is dissolved in one or more solvents to form a working solution and alternately catalytically hydrogenated and oxidized, an improvement in the catalytic hydrogenating stage is obtained by passing hydrogen and said working solution in contact with each other through a fixed catalyst bed made up of alternate sections of catalyst particles separated by sections containing non-catalyst packing; the sections containing non-catalyst packing act as dissolving zones and enhance dissolution of hydrogen in the working solution prior to these reactants entering adjacent catalyst sections.

BACKGROUND OF THE INVENTION

(A) Field of the invention

This invention relates to producing hydrogen peroxide by the anthraquinone process in which a fixed catalyst bed is used to carry out hydrogenation of an anthraquinone working compound.

(B) Description of the prior art

It is known that anthraquinone compounds, e.g., 2-ethylanthraquinone, and their tetrahydro derivatives can be used as working compounds in a process for producing hydrogen peroxide. In this process, commonly known as the anthraquinone process, a working compound is dissolved in a suitable solvent, or mixture of solvents, to form a working solution and is alternately reduced and oxidized. During the reducing stage, the working compound is hydrogenated in the presence of a catalyst to reduce it to its "hydroquinone" form. In the subsequent oxidation step the hydrogenated working compound is oxidized with air, oxygen or other oxygen-containing gases to convert it to its "quinone" form with concomitant formation of hydrogen peroxide. The hydrogen peroxide product is then removed from the working solution, preferably by extraction with water, and the remaining working solution is recycled to the hydrogenator to again commence the cyclic process for producing hydrogen peroxide. The detailed operation of this process is described fully in U.S. Pats. 2,158,525 and 2,215,883.

In the above-described process, the catalytic hydrogenation conventionally is carried out in either a "fluid bed" or a "fixed bed" hydrogenator. In a "fluid bed" the catalyst has a size of about −80 to +200 mesh and is kept suspended in a portion of the working solution which is maintained in the hydrogenator. The working solution and hydrogen are passed through the catalytic hydrogenator continuously, and the suspended catalyst is mildly agitated to promote hydrogenation of the working solution. In a "fixed bed" the catalyst, normally having a size of 4 to 100 mesh, is supported in a fixed position, preferably between porous support plates or screens, and both hydrogen and the working solution are passed simultaneously through the supported catalyst mass either concurrently or countercurrently. In this system, the catalyst is never suspended in the working solution.

One of the major costs of operating the above-defined anthraquinone process for producing hydrogen peroxide is the cost of the catalyst. The catalyst must be replaced peridically as its activity decreases in order to maintain the desired rate of hydrogenation of the anthraquinone working compound. Accordingly, any technique which will permit greater amounts of hydrogen peroxide to be produced in a commercial plant by an existing catalyst bed or which will permit a plant to produce its normal quota of peroxide using smaller amounts of catalyst is most desirable because it reduces the cost of operating the process.

OBJECTS OF THE INVENTION

It is an object of the invention to produce hydrogen peroxide by the anthraquinone process employing a fixed bed hydrogenator wherein greater amounts of hydrogen peroxide are produced per unit weight of catalyst.

It is a further object of the invention to produce hydrogen peroxide by the anthraquinone process wherein the hydrogenating efficiency of a fixed bed catalytic hydrogenation stage is improved substantially.

It is a further object of the invention to produce hydrogen peroxide by the anthraquinone process in which the formation of degradation products, not capable of forming hydrogen peroxide, is reduced.

These and other objects will be apparent from the following disclosure.

SUMMARY OF THE INVENTION

I have now found that in a continuous process for producing hydrogen peroxide, wherein a working solution (containing as essential ingredients an anthraquinone working compound dissolved in at least one working solvent) is alternately reduced and oxidized, a more effective catalytic hydrogenation can be carried out by passing the working solution and hydrogen in contact with one another through a fixed catalyst bed made up of alternate sections of catalyst particles separated by sections containing non-catalytic packing (dissolving zones) in sandwich-like formation.

I have further found that if at least one of the non-catalyst containing zones in the above fixed catalyst bed is composed of either activated alumina or activated magnesia, that this will retard the accumulation of degradation products of the anthraquinone working compound which cannot produce hydrogen peroxide during alternate reduction and oxidation.

DESCRIPTION OF THE INVENTION AND THE PREFERRED EMBODIMENTS

In carrying out the present invention, a working solution is made up containing an anthraquinone working compound, which can be alternately reduced and oxidized to produce hydrogen peroxide, dissolved in a suitable, organic solvent. The working solutions that can be used in the present process are those that contain anthraquinone working compounds such as 2-ethylanthraquinone or the 2-isopropyl-, 2-sec-butyl, 2,5-butyl-, 2-sec-amyl, 2-methyl- or 1,3-dimethyl- derivatives of anthraquinone as well as other anthraquinones well known in the hydrogen peroxide art. These working compounds are dissolved in at least one organic solvent to form the anthraquinone working solutions; two or more mixed organic solvents may be used to enhance the solubility of an anthraquinone working compound in both its hydrogenated form, i.e., the "hydroquinone form," and its oxidized form, i.e., the "quinone" form.

In accordance with the present process, the above anthraquinone working solution is passed into a catalytic hydrogenator along with gaseous hydrogen. The working compound dissolved in the working solution is subjected to reduction in the catalytic hydrogenator in the presence of a catalyst. The catalyst employed is most suitably a noble metal catalyst, such as palladium or platinum, deposited on an inert carrier. The carrier may comprise alumina, carbon, silica, silica alumina, calcium aluminum silicate, carbonates, and the like. The present discontinuous, fixed bed, catalytic hydrogenator is made up of catalyst particles, which may be of 4 to 100 mesh size, that are held in fixed, alternate sections separated by sections containing non-catalytic packing in a sandwich-like construction. The fixed bed is discontinuous in that each of the alternating sections of catalyst particles are not connected together, but rather are spaced apart from one another, and the spaces between the sections of catalyst particles are filled with packing that does not catalyze the hydrogenation reactions (non-catalytic packing).

The non-catalytic packing can be made up of any material which does not dissolve in the working solution and which does not deleteriously affect the working solution or catalytic hydrogenation reaction which takes place in the catalyst sections of the hydrogenator. The physical configuration of the packing must be such that it promotes and enhances mixing of the working solution and hydrogen without channeling. Examples of suitable non-catalytic packing includes particles of alumina, carbon, silica, silica alumina, calcium aluminum silicate, carbonates, glass, and the like, as well as porous, inert inserts such as screens, plates, aggregates, etc. made up of any inert metal, plastic or ceramic.

The exact reason why the present, novel catalytic hydrogenator is capable of more effective hydrogenation per unit quantity of catalyst is not known. However, without intending in any way to limit the invention to any theory or mode of operation, the following explanation is given. It is believed that when the hydrogen gas and anthraquinone come in contact with each other in the presence of the catalyst, that for a reaction to occur, the hydrogen must first be dissolved in the solution; the dissolved hydrogen and working compound then react at an active site on the catalyst. The rates at which hydrogen dissolves in the working solution is believed to be slower than the rate at which the working solution is catalytically hydrogenated by an active catalyst. This is believed to preclude all but dissolved hydrogen from reacting with the anthraquinone working compound in the catalytic hydrogenator.

At the normal temperatures and pressures used in conventional catalytic hydrogenators, the solubility of hydrogen in the working solution is only about 10% of that required for the desired extent of hydrogenation. Consequently, gaseous hydrogen must be redissolved continually in the working solution as it passes through the catalyst bed to achieve the degree of hydrogenation desired. It is believed that the configuration of the present catalytic hydrogenator facilitates the gaseous hydrogen to dissolve in the working solution in those sections containing the non-catalytic packing (dissolving zones); thereafter, the working solution with the required, dissolved hydrogen passes directly into an adjacent catalytic section, permitting more complete hydrogenation to occur. This sequence is repeated throughout the entire fixed bed catalytic hydrogenator as the working solution and hydrogen pass alternately into a section (dissolving zone) containing non-catalytic packing where hydrogen is dissolved in the working solution, followed by a catalytic section where the dissolved hydrogen and the working compound catalytically react to hydrogenate the working compound.

The proportion of working compound which is hydrogenated per pass (depth of hydrogenation) through the catalytic hydrogenator normally is at least about 40 to 80%. If higher depths of hydrogenation are desired, these may be carried out readily, but with some increase in the formation of degradation products.

The working solution, after leaving the catalytic hydrogenator, is passed into an oxidizer where it is contacted with air or oxygen. In the normal mode of operation, the working solution flows continuously into the base of the oxidizing tank and is removed as oxidized overflow through a standpipe at the top of the oxidizing vessel. Air, oxygen or other oxygen-containing gas is pumped into diffusers located at the base of the oxidizing vessel and is released through the diffuser openings as a continuous upward flow of dispersed bubbles passing through the working solution. The oxidation reaction normally takes place at atmospheric pressures, although either subatmospheric or superatmospheric pressures may be employed in the oxidizer. During this oxidation stage, the anthrahydroquinone working compound is oxidized to its "quinone" for with concomitant release of hydrogen peroxide.

The oxidized mixture is removed from the oxidizer and subjected to a water extraction in any conventional extractor to dissolve the hydrogen peroxide, preferentially in the aqueous extract phase. The raffinate and water extract are then permitted to separate into an organic phase and a water phase. The water phase containing most of the hydrogen peroxide is separated from the organic phase and passed to distillation units to purify and concentrate the hydrogen peroxide, while the organic phase made up essentially of the working solution is recycled to the hydrogenator to once again commence the cycle for producing hydrogen peroxide.

During this cyclic hydrogenation and oxidation of a working solution, the working compound is gradually converted to degradation products that are unable to produce hydrogen peroxide. The rate of formation of these degradation products increases as the temperature of the working solution being hydrogenated and oxidized is elevated. Additionally, as the proportion of the working compound which is hydrogenated per pass through the system (also termed "depth of hydrogenation") is increased, the amount of degradation products also rises sharply. In addition to forming degradation products, the anthraquinone working compounds also undergo hydrogenation of other than the quinone groups during the catalytic hydrogenation step. This results in the gradual formation of corresponding tetrahydroanthraquinone derivatives of the working compound. These compounds, unlike the degradation products discussed above, will produce hydrogen peroxide upon cyclic reduction and oxidation in the same manner as the original anthraquinone working compound. Accordingly, the term "degradation products" does not apply to these tetrahydro derivatives of the anthraquinone working compound.

In a preferred embodiment of the present invention, the amount of the above degradation products accumulating in the working solution during cyclic hydrogenation and oxidation of the working compound can be reduced materially by utilizing either activated alumina or activated magnesia particles in those sections of the fixed bed which contained non-catalytic particles. In the makeup of such a bed, the fixed, alternate sections of catalyst particles are separated by sections of activated alumina or activated magnesia particles, and this sandwich-like construction is repeated throughout the depth of the bed.

The activated alumina and/or activated magnesia located in alternating sections between the catalyst sections perform two functions simultaneously. Initially, they serve as dissolving zones in which gaseous hydrogen is dissolved more readily in the anthraquinone working solution just prior to its entering an adjacent catalytic section to be catalytically hydrogenated; simultaneously, the working solution is regenerated by converting some of its degradation products back to compounds which can produce hydrogen peroxide upon cyclic hydrogenation and oxidation. By this means, the accumulation of degradation products in the working solution is retarded.

Any activated alumina or magnesia may be employed in the present invention. The term "activated alumina"

as used herein, refers to any alumina obtained from natural or synthetic hydrated alumina whether or not it contains minor proportions of silica or other materials and which is hydrated by heating so as to convert the alumina to a less hydrated form, such as alpha-alumina monohydrate or gamma-alumina monohydrate, without going to corundum (which is inactive). Normally, activation can be effected by heating the alumina to temperatures of from 300 to 800° C. in order to convert it to a microporous alumina having an extensive surface area. Likewise the term "activated magnesia" is used to mean substantially anhydrous magnesia prepared by heating various magnesias, such as magnesium hydroxide, magnesium carbonate, magnesium nitrate, and the like, in such a manner as to produce a microporous, physical form having an extensive surface area.

In general, the use of activated alumina or activated magnesia in the hydrogenator is desired in those sections downstream from the flow of working solution where the anthrahydroquinone concentration approaches the desired depth of hydrogenation. The activated alumina or magnesia appears to be most effective at this point. The presence of the activated magnesia or activated alumina at this location in the hydrogenator acts as a deterrent towards further degradation of the working solution and also is more effective in regenerating by-products to useful quinones.

The depth of the sections of catalyst particles, as well as the depth of the sections containing non-catalytic packing, will vary depending upon the flow rate of the working solution, the packing density and the size of the particles. However, in general, it is desired that the sections of non-catalyst packing be of sufficient depth to permit substantial dissolution of the hydrogen in the working solution so that acceptable hydrogenation rates are obtained in the succeeding, adjacent, catalyst sections. The depths of the catalyst sections need not be the same as those of the zones containing the non-catalytic packing, nor do the individual zones, either catalytic or packing, have to be of uniform depth throughout the bed.

In many instances it is desirable to have a zone containing non-catalytic packing directly adjacent that point in the catalytic hydrogenator (normally, the uppermost section) where the working solution and hydrogen are introduced. This prevents the injected working solution from directly impinging onto catalyst particles and eroding the catalyst from its carrier. This zone of non-catalytic packing also uniformly distributes the incoming working solution and hydrogen throughout the cross-sectional area of the hydrogenator. This permits maximum dissolution of the hydrogen in the working solution as they enter the hydrogenator; the resulting mixture then desirably contacts the entire cross-section of catalyst particles in adjacent sections, permitting maximum catalytic hydrogenation.

The catalytic hydrogenator of the present invention has many advantages over conventional fixed bed hydrogenators. Initially, much less catalyst is necessary in the makeup of the instant fixed catalyst bed because of the inclusion of dissolving zones which contain essentially non-catalytic packing. Nevertheless, the total amount of hydrogen peroxide produced by a catalyst bed containing these dissolving zones is not diminished by the decrease in total amount of catalyst present in the catalytic hydrogenator, vis-a-vis, conventional catalytic hydrogenators. In many gases the production rate of $H_2O_2$ can be maintained with only 50% of the original catalyst employed.

The essentially non-catalytic dissolving zones also function as equilibrium zones for the working solution and hydrogen gas in the catalytic hydrogenator, making it much easier to control. Further, the present dissolving zones, by proper selection of the size and type of non-catalytic packing used, can reduce the pressure drop across the entire hydrogenator so that the pressure drop can be adjusted within desired levels. This eliminates, to some extent, the limitations of catalyst size imposed by excessive pressure drops if the bed is either too deep or the catalyst too small.

The use of dissolving zones in the fixed bed which contain either activated magnesia or activated alumina also permits constant regeneration of the working solution at the site where degradation products most likely form, i.e., in the hydrogenator where the combination of excess hydrogen, a catalyst and a partially or completely hydrogenated anthraquinone working compound can lead to undesired reactions. The presence of these activated materials in the hydrogenator also act as a deterrent towards additional formation of degradation products.

While the purpose of the dissolving zones may be adequately satisfied by introducing the working solution and hydrogen through either end of the catalytic hydrogenator, it is considered within the scope of the present invention to introduce all or a portion of the hydrogen into other sections of the hydrogenator. In this embodiment the hydrogen may be staged by introducing all or part of the hydrogen directly into the side of the catalytic hydrogenator, e.g., directly into the dissolving zones, to maintain the dissolved hydrogen content of the working solution at a high level.

The following examples are given to illustrate the invention, but are not deemed to be limiting thereof.

EXAMPLE 1

Run A.—Process of the invention

A working solution was made up containing anthraquinone working compounds dissolved in a mixed working solvent having the following proportions:

| Working solvent: | Amount, percent by volume |
|---|---|
| Dimethylnaphthalene | 47 |
| Trioctylphosphate | 33 |
| Kerosene (boiling point 500–650° C.) | 20 |

| Anthraquinone working compounds: | Amount, weight percent |
|---|---|
| 2-ethylanthraquinone | 2.58 |
| Tetrahydro-2-ethylanthraquinone | 6.15 |
| An epoxide derivative of tetrahydro-2-ethylanthraquinone | 1.50 |
| Total effective "quinone" concentration | 8.73 |

A fixed bed catalytic hydrogenator was prepared in a glass tube measuring 0.5 inch in diameter and 24 inches deep by placing 11.6 grams of a catalyst in the vessel on a supporting screen followed by 11.6 grams of inert particles. The catalyst was 0.3% by weight palladium deposited on a dolomite carrier having a size of 10–16 mesh. The inert particles were 10–16 mesh plain dolomite having a B.E.T. surface area of less than 0.5 m.$^2$/g. This process was repeated until an 18-inch deep bed was completed with alternate layers of catalyst and uncoated dolomite so as to obtain four 2½ inch deep zones of catalyst spaced between equally deep zones of inert packing. The total amount of catalyst used weighed 46 grams; the total inert dolomite used also weighed 46 grams. The uppermost layer was plain dolomite.

The above-defined working solution was then pumped into the top of the above-prepared catalytic bed at a total flow rate of 125 cc. per minute along with hydrogen gas. Of this flow rate 100 cc./min. of the working solution was immediately recycled back through the hydrogenator, while 25 cc./min. was sent as forward flow to an oxidizer hereinafter described. The temperature in the catalytic hydrogenator was maintained between 43 and 46° C., and the hydrogen was maintained under a pressure of 30 p.s.i.g., at the top of the catalytic hydrogenator. The forward flow stream of 25 cc./min. of the working solution was pumped into an oxidizer made up of a glass tube having a diameter of about 2 inches and having a height of about 3 feet. The stream of hydrogenated working solution passed into the oxidizer was then oxidized by passing pure oxygen gas through the working solution until oxidation of the solution was complete. The temperature of the solution in the oxidizer was maintained at about 44° C. Twenty-five cc./min. of working solution was then removed from the oxidizer and passed to an extraction unit where it was extracted with water. The water removed from the extractor contained 6.9 grams of hydrogen peroxide per liter of working solution removed from the extractor. This amounted to a production rate of 5.4 pounds of hydrogen peroxide (100% basis) per pound of catalyst per 24 hours of processing. The working solution which was separated from the aqueous phase in the extractor was then recycled to the hydrogenator for additional processing.

Run B.—Process of the prior art

A catalytic hydrogenator was prepared from a glass tube 0.5 inch in diameter and 24 inches deep by filling the tube to a depth of 18 inches with a fresh, identical catalyst, to that used in Run A. The entire 18-inch bed was supported on a screen at the base of the hydrogenator, and the total weight of the catalyst employed was 91.0 grams. An identical working solution to that specified in Run A was then passed through this conventional, fixed bed, catalytic hydrogenator at the same rates specified in Run A, and the hydrogenated working solution was processed in exactly the same way as Run A to extract the mined that 6.96 grams of hydrogen peroxide (100% basis) was obtained per liter of working solution passed through the extractor. On a production basis, this amounted to 2.78 pounds of hydrogen peroxide (100% basis) per pound of catalyst per 24 hours of processing.

EXAMPLE 2

The process of Example 1, Run A, was repeated except that in place of dolomite particles as the non-catalytic packing, 8 to 14 mesh particles of activated alumina were employed. The resulting hydrogen peroxide production was substantially the same as that obtained in Run A. In addition, analysis of the working solution indicated that the epoxide content of the working solution (degradation product) was reduced and the tetrahydroanthraquinone content of the working solution was proportionally increased, thereby increasing the total effective quinone content of the working solution.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing hydrogen peroxide by the anthraquinone process in which an anthraquinone compound is dissolved in one or more organic solvents to form a working solution and continuously catalytically hydrogenated and oxidized, the improvement which comprises passing hydrogen and said working solution in contact with each other in a fixed catalyst bed made up of alternate sections of hydrogenation catalyst particles separated by section, containing non-catalytic packing in sandwich-like formation, said sections of packing acting as dissolving zones to facilitate the dissolution of gaseous hydrogen in the working solution.

2. Process of claim 1 wherein the catalyst particles contain palladium.

3. Process of claim 1 wherein said packing is made up of particles that are inert relative to the working solution.

4. Process of claim 1 wherein the non-catalyst packing is dolomite particles.

5. Process of claim 1 wherein said non-catalytic packing is made up of particles selected from the group consisting of activated alumina and activated magnesia.

6. Process of claim 1 wherein the anthraquinone working compound is 2-ethylanthraquinone.

7. Process of claim 1 wherein the section directly adjacent the incoming working solution contains non-catalytic packing.

8. In the process of producing hydrogen peroxide by an anthraquinone process in which an anthraquinone compound is dissolved in one or more organic solvents to form a working solution and continuously catalytically hydrogenated and oxidized, the improvement which comprises passing hydrogen and said working solution in contact with each other through a plurality of discontinuous, fixed bed catalytic zones containing hydrogenation catalyst particles separated by intermediate zones which contain non-catalytic packing, said intermediate zones acting to facilitate dissolution of gaseous hydrogen in the working solution intermediate said catalytic zones containing hydrogenation catalyst particles.

References Cited

UNITED STATES PATENTS 2,739,875   5/1956   Sprauer et al. _____ 23—207

FOREIGN PATENTS 585,331   10/1959   Canada _____ 23—207

OSCAR R. VERTIZ, Primary Examiner

H. S. MILLER, Assistant Examiner

U.S. Cl. X.R.

260—369

UNITED STATES PATENT OFFICE
CERTIFICATE OF CORRECTION

Patent No. 3,565,581             Dated  February 23, 1971

Inventor(s)  Nathan D. Lee

It is certified that error appears in the above-identified patent and that said Letters Patent are hereby corrected as shown below:

Column 4, line 13, "for" should read --form--.

Column 7, line 29, after the word "to extract the" the following was omitted and should be inserted:  --hydrogen peroxide produced therefrom. It was determined--.

Column 7, line 30 delete "mined".

Column 8, line 10, claim 1, "section" should read --secti

Signed and sealed this 24th day of September 1974.

(SEAL)
Attest:

McCOY M. GIBSON JR.
Attesting Officer

C. MARSHALL DANN
Commissioner of Patent